W. GEDVILLAS.
ANIMAL TRAP.
APPLICATION FILED SEPT. 14, 1921.

1,420,833.

Patented June 27, 1922.

INVENTOR.
BY William Gedvillas
George C. Heinitz
ATTORNEY.

UNITED STATES PATENT OFFICE.

WILLIAM GEDVILLAS, OF MADISON, ILLINOIS.

ANIMAL TRAP.

1,420,833.  Specification of Letters Patent.  Patented June 27, 1922.

Application filed September 14, 1921. Serial No. 500,551.

*To all whom it may concern:*

Be it known that I, WILLIAM GEDVILLAS, a citizen of United States, residing at Madison, county of Madison, and State of Illinois, have invented certain new and useful Improvements in Animal Traps, of which the following is a specification.

This invention relates to improvements in traps, such as are used in catching small animals, mice, rats and the like, and it is the principal object of the invention to provide a trap of simple construction by means of which a plurality of animals may be caught and disposed of at a time.

Another object of the invention is to provide a trap which may be set in an easy manner, and which, upon being sprung, effectively secures the animal within.

A further object of the invention is the provision of a trap which can be adjusted according to the various sizes of the animals to be trapped.

These and other like objects are attained by the novel construction and combination of parts hereinafter described and shown in the accompanying drawing, forming a material part of this disclosure, and in which:—

Figure 1:
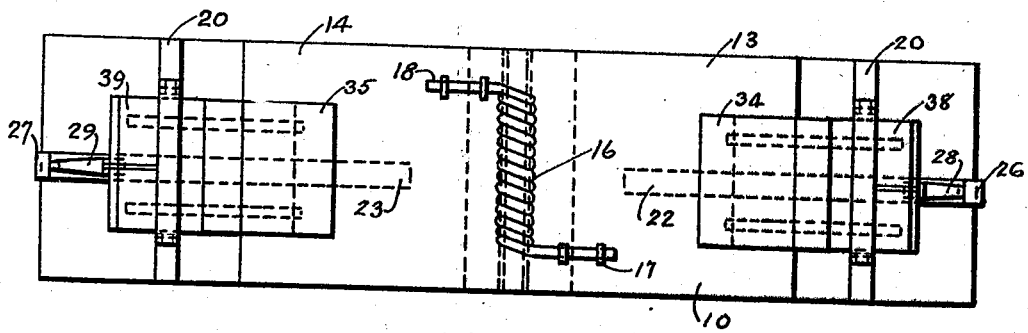
Figure 1 is a top plan view of a trap constructed according to the present invention.
Figure 3:
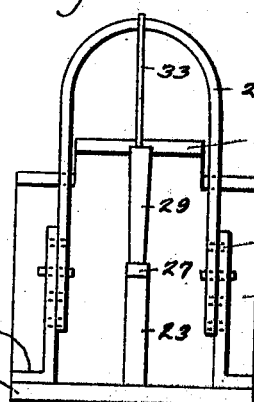
Figure 3 is an end view of the trap.

The trap comprises a base or board 10 in the center of which are secured on its upper face by means of the hinges 11 and 12 the lower faces of the inner ends of two smaller boards 13 and 14, the upper faces of which are connected by a coil spring 15, 16, the ends of which press against the upper faces of the boards 13 and 14 to which they are secured in a manner indicated at 17 and 18 respectively.

Near the outer ends of the board 10 are secured to the same the foot parts 19 of hoops 20 which are made in two parts adjustable with respect to each other in vertical direction and can be locked in their respective adjusted positions by means of pins passed through openings 21.

Figure 2:
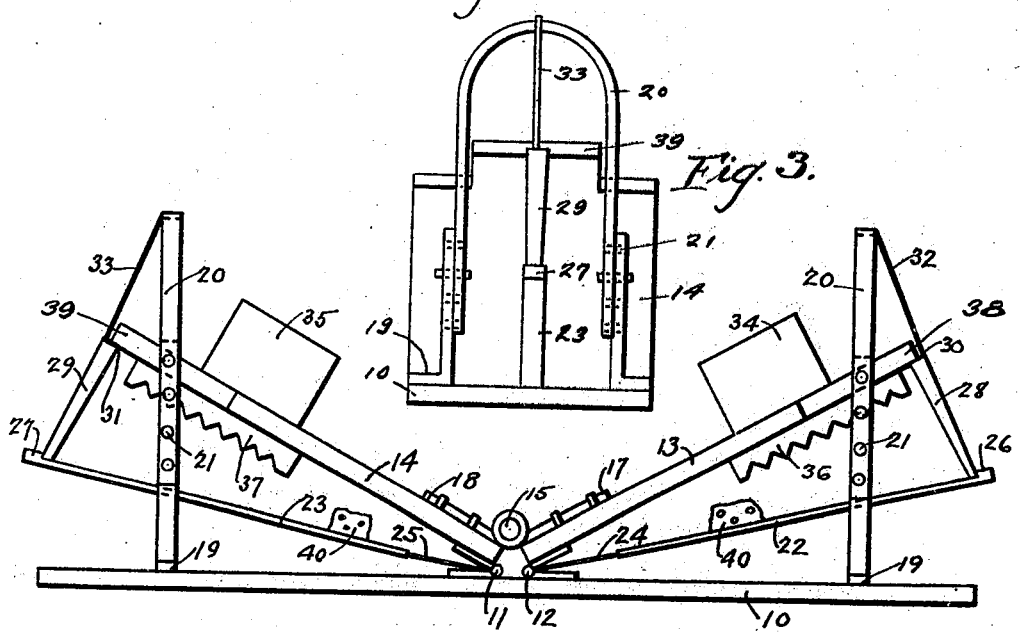
Figure 2 is a side view of the trap set for action.

Tongues 22 and 23 are secured at their inner ends by cables 24, 25 and disposed between board 10 and boards 13 and 14, their outer ends being provided with shoulders 26 and 27, adapted to be engaged, when the trap is set by the lower ends of pintles 28 and 29, the upper edges of which engage, when the trap is set, the lower outer edges of the boards 13 and 14 in the manner indicated at 30 and 31 in Figure 2. It will be clear that the height of the members 13 and 14 can be adjusted by the proper adjustment of the height of the hoops which will raise or lower, as the case may be, the pintles 28 and 29.

In order to avoid a loss of these pintles when the trap is sprung, these pintles are secured to the upper rounded apex of each of the hoops by means of strings 32 and 33. Weights 34 and 35 are provided upon the boards 13 and 14 to ensure the trapping and disposing of the animal, and this is further ensured by the plurality of prongs 36 and 37 arranged in blocks attached to the lower faces of the boards 13 and 14. The front ends of these boards 13 and 14 are reduced to provide tongues 38 and 39 which are passed through the hoops 20.

It will be clear that if a bait 40 is secured upon tongues 22 and 23 and an animal tries to swallow the same and moves the tongues 22 and 23, the engagement between the pintles 28 and 29 and the shoulders 26 and 27 will be broken and the boards 13 and 14 under the influence of the spring 16 and under the weights 34 and 35 will press the prongs 36 and 37 into the body of the animal which will thus be securely caught in the trap.

It will be apparent that many changes may be made in the preferred form of my trap as herein disclosed without deviation from the scope and spirit of my invention.

What I claim as new and desire to secure by Letters Patent of the United States is—

1. A trap of the class described comprising a base board, adjustable hoops erected upon the base board near its outer ends, a pair of trapping boards hingedly secured at their inner ends to the base board in approximately the center thereof, the adjustment of said hoops allowing an adjustment of the height of said trapping boards, means attached to said adjustable hoops for holding the outer ends of said trapping boards elevated above the ends of said base when the trap is set, and means for normally pressing said trapping boards against said base board.

2. In a trap of the character described comprising a base board, a pair of adjustable vertical hoops secured with their lower feet on said base board, a pair of trapping boards, the adjustment of said hoops allowing an adjustment of the height of said trapping boards, hinges connecting the lower inner edges of said trapping boards to the base board in approximately the middle thereof, a coil spring connecting the upper inner edges of said trapping boards, and pressing with its free ends on the upper faces of said trapping boards, means for securing the ends of said spring to said boards, weights on top of said trapping boards and blocks provided with a plurality of springs on the lower face of said boards, a pair of tongues each provided with a frontal shoulder, strings for securing the inner ends of said tongues to said hinges, pintles engaging with their lower ends said shoulders and with their upper edges the lower front edges of said trapping boards, and strings securing said pintles to said hoops.

In testimony whereof I have affixed my signature.

WILLIAM GEDVILLAS.